United States Patent [19]
Ohara et al.

[11] Patent Number: 5,671,018
[45] Date of Patent: Sep. 23, 1997

[54] MOTION ADAPTIVE VERTICAL SCALING FOR INTERLACED DIGITAL IMAGE DATA

[75] Inventors: Kazuhiro Ohara, Plano; Vishal Markandey, Dallas, both of Tex.; Robert J. Gove, Los Gatos, Calif.

[73] Assignee: Texas Instruments Incorporated, Dallas, Tex.

[21] Appl. No.: 384,986

[22] Filed: Feb. 7, 1995

[51] Int. Cl.$^6$ .................................................. H04N 7/01
[52] U.S. Cl. ............................................. 348/452; 348/458
[58] Field of Search ........................... 348/704, 709, 348/458, 451, 452, 699, 700, 701, 702, 703, 431, 435, 439, 446, 441, 448; H04N 3/223, 9/64, 5/14, 7/01, 11/20, 7/12, 11/02, 11/04

[56] References Cited

U.S. PATENT DOCUMENTS

| | | | |
|---|---|---|---|
| 5,005,078 | 4/1991 | Gillard | 348/452 |
| 5,021,870 | 6/1991 | Motoe et al. | 348/451 |
| 5,245,037 | 9/1993 | Sugiyama et al. | 348/452 |
| 5,381,183 | 1/1995 | Ishizuka et al. | 348/458 |
| 5,467,138 | 11/1995 | Gove | 348/452 |
| 5,475,438 | 12/1995 | Bretl | 348/452 |

OTHER PUBLICATIONS

Hiroshi Miyaguchi, et al, *Digital TV With Serial Video Processor,* IEEE Transactions on Consumer Electronics, vol. 36, No. 3, Aug. 1990, 318–326.

Masafumi Yugami, et al, *EDTV With Scan–Line Video Processor,* IEEE Transactions on Consumer Electronics, vol. 38, No. 3, Aug. 1992, 553–562.

*SVP(Scan–line Video Processor) for Digital Videl Signal Processing, Products Overview (SVP/PTC),* Texas Instruments (1994), pp. 49–52.

*Primary Examiner*—Victor R. Kostak
*Attorney, Agent, or Firm*—Robert C. Klinger; James C. Kesterson; Richard L. Donaldson

[57] ABSTRACT

A motion adaptive method for vertically scaling an image. The image data is analyzed to obtain a motion magnitude value for each pixel (31). The pixel data is then processed with two scaling processes (35, 36), performed in parallel. One scaling process is better suited for low motion images and the other is better suited for high motion images. The motion magnitude value is used to select between or combine (38) the pixel data outputs of the two scaling processes (35, 36).

12 Claims, 3 Drawing Sheets

MOTION ADAPTIVE VERTICAL SCALING FOR INTERLACED DIGITAL IMAGE DATA

TECHNICAL FIELD OF THE INVENTION

This invention relates to digital image display systems, and more particularly to an improved method for vertical scaling.

BACKGROUND OF THE INVENTION

Today's digital image display systems are designed to perform various video signal processing tasks. These digital image display systems include computer display systems, as well as many of today's television systems.

One video signal processing task is scaling, where the number of pixels per row is increased or decreased (horizontal scaling) or the number of rows is increased or decreased (vertical scaling). Various algorithms have been devised to add or subtract the pixel data required for scaling.

Many of today's television signals have interlaced fields, where odd lines are in one field and even lines are in the next. On a CRT display, the fields are scanned separately, but every two adjacent fields are perceived as one complete "frame" of an image.

The conventional approach to vertical scaling is to use data from a single field to create the new data. Pixel values of neighboring lines from the same field are interpolated to provide pixel values for new lines. Although the use of data from different fields might result in better blending, if the image is in motion, the use of data from different fields can diminish picture quality.

SUMMARY OF THE INVENTION

One aspect of the invention is a method of vertically scaling an image represented by a digital video signal having interlaced fields. The method is performed on a pixel-by-pixel basis. For each new pixel to be generated, a corresponding motion magnitude value is calculated. This motion magnitude value indicates the extent to which the portion of the image represented by the new pixel is in motion. An intra-field pixel value of the new pixel is generated, using pixel values of neighboring pixels in the same field. At the same time, an inter-field pixel value of the new pixel is also generated, using pixel values of neighboring pixels in time-separated fields. The motion magnitude value is used to select or combine the intra-field pixel value and the inter-field pixel value, thereby generating the new pixel value. These steps are repeated for each pixel of the image.

An advantage of the invention is that it optimizes the scaling process in accordance with whether or not the image is in motion. The result is improved picture quality of an image display system.

DETAILED DESCRIPTION OF THE INVENTION

Figure 1:
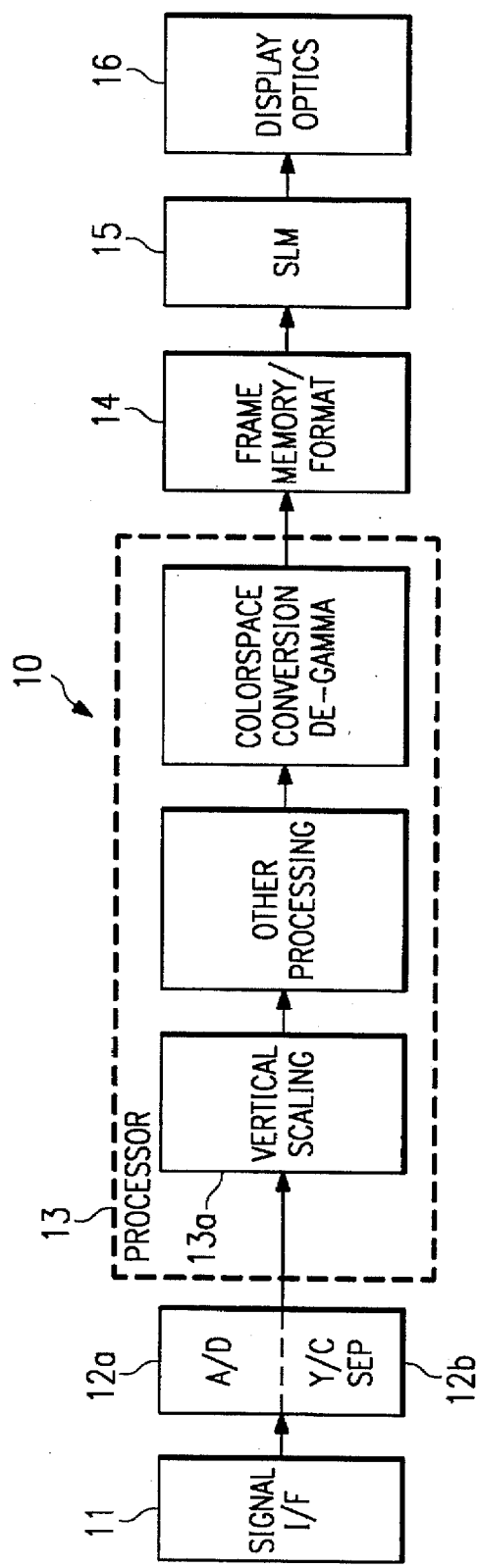
FIGS. 1 and 2 are block diagrams, each representing the basic components of a digital image display system.
Figure 2:
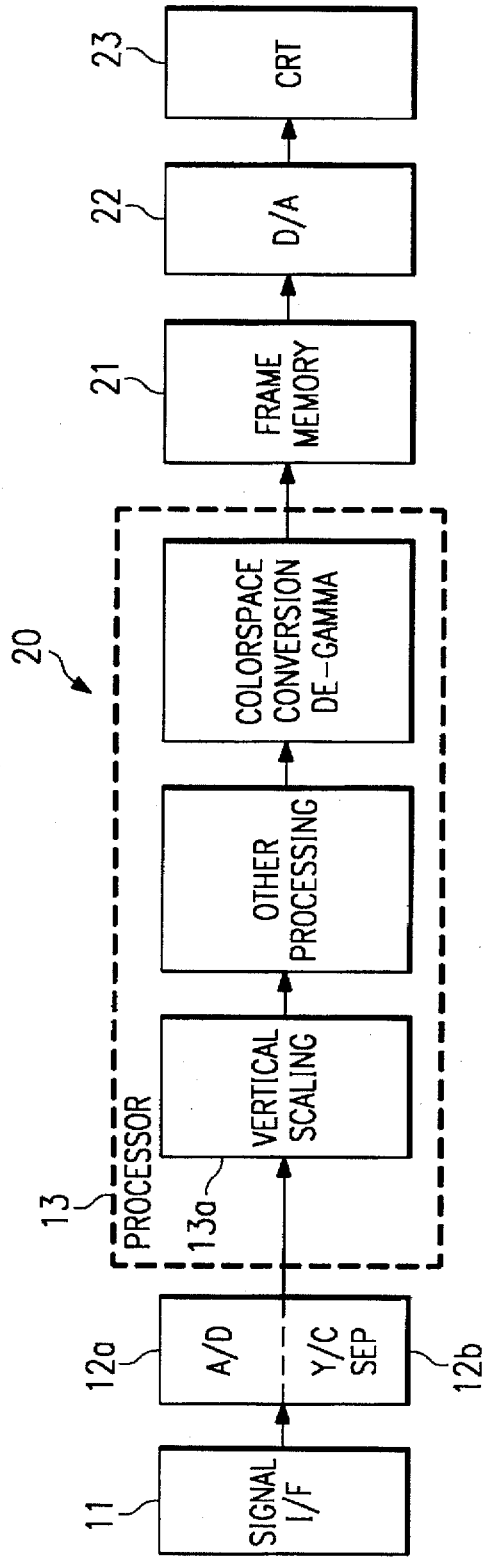

FIGS. 1 and 2 are block diagrams, each representing the basic components of a digital image display system 10 and 20, respectively. Both systems either receive digital data or convert analog data to digital data, and perform various processing on the data. System 10 uses a spatial light modulator (SLM) to generate images from the data. System 20 uses a cathode ray tube (CRT), where the data is converted to analog form after being processed. In general, the invention could be used with any display system that digitally processes image data.

The following description is in terms of system 10, and is directed to a vertical scaling process performed by processor 13. The process is motion adaptive, so that the scaling is optimized in accordance with the degree of motion in the image. The processor 13 of system 20 operates in the same manner as the processor 13 of system 10.

For purposes of example, system 10 is illustrated as receiving an analog video signal, such as a broadcast television signal. It is assumed that the input signal is a "color difference" signal, having a luminance component and a color difference component. Only those components significant to main-screen processing are shown. Other components, such as might be used for processing synchronization and audio signals or for features such as closed captioning, are not shown.

As an overview of the operation of display system 10, signal interface 11 receives the analog video signal and separates video, synchronization, and audio signals. Signal interface 11 delivers the video signal for the main image to A/D converter 12a and Y/C separator 12b, which convert the signal into pixel-data samples and which separate the luminance ("Y") data from the chrominance ("C") data, respectively. In FIG. 1, the signal is converted to digital data before Y/C separation, but in other embodiments, Y/C separation could be performed before A/D conversion, using analog filters.

Processor system 13 prepares the data for display, by performing various pixel data processing tasks. Processor system 13 includes various memory devices for storing pixel data during processing, such as field and line buffers.

In the example of this description, vertical scaling is performed on luminance data, before colorspace conversion. In addition to these tasks, other tasks performed by processor system 13 could include linearization (de-gamma) and de-interlacing to convert interlaced fields into display frames. The method of the invention could also be performed on demodulated C (chrominance) data as well as on Y data, or it could be performed on RGB data.

In the preferred embodiment, processor system 13 includes a "scan-line video processor" for performing scaling and aperture correction. This device is commercially available from Texas Instruments Incorporated, and permits line-by-line processing of pixel data. It may be programmed in accordance with the invention described herein.

Frame memory 14 receives processed pixel data from processor system 13. Frame memory 14 formats the data, on input or on output, into "bit-plane" format, and delivers the bit-planes to SLM 15 one at a time. The bit-plane format permits each pixel element of SLM 15 to be turned on or off in response to the value of one bit of data at a time. In a typical display system 10, frame memory 14 is a "double buffer" memory, which means that it has a capacity for at least two display frames. The buffer for one display frame can be read out to SLM 15 while the buffer for another display frame is being written. The two buffers are controlled in a "ping-pong" manner so that data is continuously available to SLM 15.

SLM 15 may be any type of SLM. Although this description is in terms of a DMD-type of SLM 15, other types of SLMs could be substituted into display system 10 and used for the invention described herein. For example, SLM 15 could be an LCD-type SLM. Details of a suitable SLM 15 are set out in U.S. Pat. No. 4,956,619, entitled "Spatial Light Modulator", which is assigned to Texas Instruments Incorporated, and incorporated by reference herein. In the example of this description, SLM 15 has a 640×480 array of mirror elements, each of which is individually addressable. When addressed, the direction in which each mirror tilts, on or off, results in a reflected image.

Display optics unit 16 has optical components for receiving the image from SLM 15 and for illuminating an image plane such as a display screen. For color displays, the bit-planes for each color could be sequenced and synchronized to a color wheel that is part of display optics unit 16. Or, the data for different colors could be concurrently displayed on three SLMs and combined by display optics unit 16. Master timing unit 17 provides various system control functions.

A more comprehensive description of a DMD-based digital display system is set out in U.S. Pat. No. 5,079,544, entitled "Standard Independent Digitized Video System", and in U.S. patent Ser. No. 08/147,249, entitled "Digital Television System", and in U.S. patent Ser. No. 08/146,385, entitled "DMD Display System", each assigned to Texas Instruments Incorporated, and each incorporated by reference herein. U.S. patent Ser. No. 07/678,761, entitled "DMD Architecture and Timing for Use in a Pulse-Width Modulated Display System", describes a method a formatting video data for use with a DMD-based display system and a method of modulating bit-planes of data to provide varying pixel brightness. The general use of a DMD-based display system with a color wheel to provide sequential color images is described in U.S. patent Ser. No. 07/809,816, entitled "White Light Enhanced Color Field Sequential Projection". These patent applications are assigned to Texas Instruments Incorporated, and are incorporated herein by reference.

Figure 3:
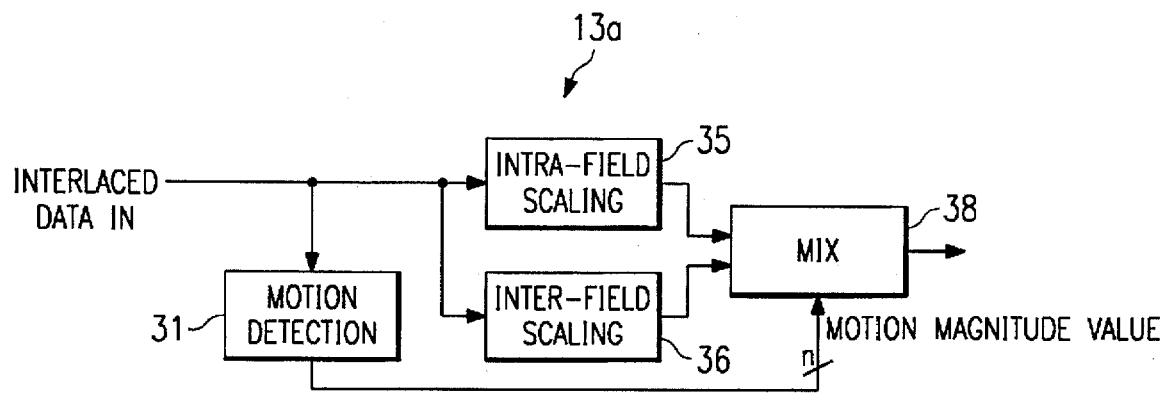
FIG. 3 is a functional block diagram of the vertical scaling process performed by the processor of FIGS. 1 and 2.

FIG. 3 is a functional block diagram of the vertical scaling process 13a. The steps illustrated in FIG. 3 are implemented with programming stored in a program memory to be executed by processor system 13. As stated above, for purposes of example, the data being processed is Y pixel data, although demodulated C pixel data (Cr, Cb or R-Y, B-Y or I, Q) or RGB pixel data could be similarly processed. As stated above, the process of FIG. 3 could be implemented with one or more serial video processors, which process pixel values on a line-by-basis.

As shown in FIG. 3, the data is analyzed with a motion detection process 31. Various motion detection methods may be used, but in general, motion detection involves comparing field-to-field pixel values. A large difference in values of the same pixel in time-separated fields indicates motion of the portion of the image represented by that pixel.

Typical motion detection algorithms are performed on a pixel-by-pixel basis. For example, for each pixel to be generated, a value of a neighboring pixel in a current field may be compared to the value of the same neighboring pixel in a time-separated field. When the data is interlaced, corresponding values of the same pixel exist in two fields (field n and field n-2) that are separated by an intervening field (field n-1). Thus, corresponding pixels in odd lines may be compared, and similarly, corresponding pixels in even lines may be compared.

Figure 4:
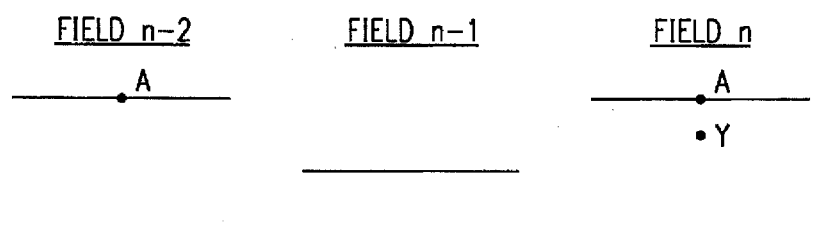
FIG. 4 illustrates one example of motion detection.

FIG. 4 illustrates motion detection process 31 described in the preceding paragraph. Expressed mathematically, where the pixel to be generated is Y, the neighboring pixel is A, and the motion value for the new pixel is M:

$$M = A(n) - A(n-2)$$

The two values of A in the two fields n and n-2 are "corresponding" values of the same pixel. The motion magnitude value, M, is a pixel difference value of these corresponding pixel values.

More complex motion detection algorithms may be used. For example, an average of pixel difference values from more than two time-separated fields may be calculated.

Figure 5:
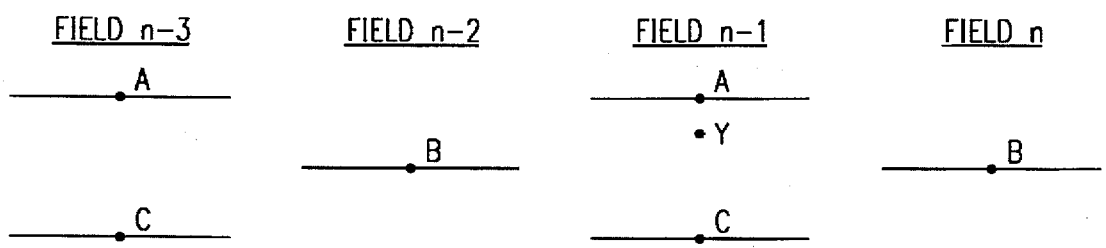
FIG. 5 illustrates a second example of motion detection.

FIG. 5 illustrates a weighted average motion detection process 31. Where the pixel to be generated is Y, the neighboring pixel values are A, B, and C, and the motion value for the new pixel is M:

$$M = \tfrac{1}{4}(A(n-1) - A(n-3)) + \tfrac{1}{2}(C(n-1) - C(n-3)) + \tfrac{1}{4}(B(n) - B(n-1)).$$

Another example of a motion detection algorithm, used for motion adaptive de-interlacing, is described in U.S. patent Ser. No. 08/384,986, entitled "Video Display System with Digital De-Interlacing", assigned to Texas Instruments and incorporated by reference herein. A motion detection algorithm with programming for a serial video processor is described in Yugami et al, "EDTV with Scan-Line Video Processor", *IEEE Transactions on Consumer Electronics*, Vol. 38, No. 3 (1992). These motion detection algorithms could be used for obtaining M for purposes of scaling as described herein.

The result of the motion detection process is an n-bit value, M, whose magnitude indicates motion. Each pixel to be generated by scaling has an associated M value.

Referring again to FIG. 3, the pixel data is also processed with both an inter-field scaling process 35 and an intra-field scaling process 36. These processes are performed in parallel on the same stream of pixel data. They both generate new pixel values for the vertically scaled image, but use different data.

The intra-field scaling process 35 is performed with data in the same field. Intra-field scaling is suitable for images that have motion, because temporal variations in the image from frame to frame will not be reflected in the new pixel values.

It may use conventional scaling techniques, such as line-doubling or interpolation, to create new lines of pixel data. In general, interpolation computes the value of the new pixel by computing a weighted sum of original pixel values on either side of it. The closer the input pixels are to the new pixel, the more weight it is given. If the pixel to be interpolated is to have the value Y, and it is distance a from input pixel A1 and distance b from input pixel A2, where a+b=1, the new pixel value would be:

$$X = a\,A1 + b\,A2$$

Figure 6:
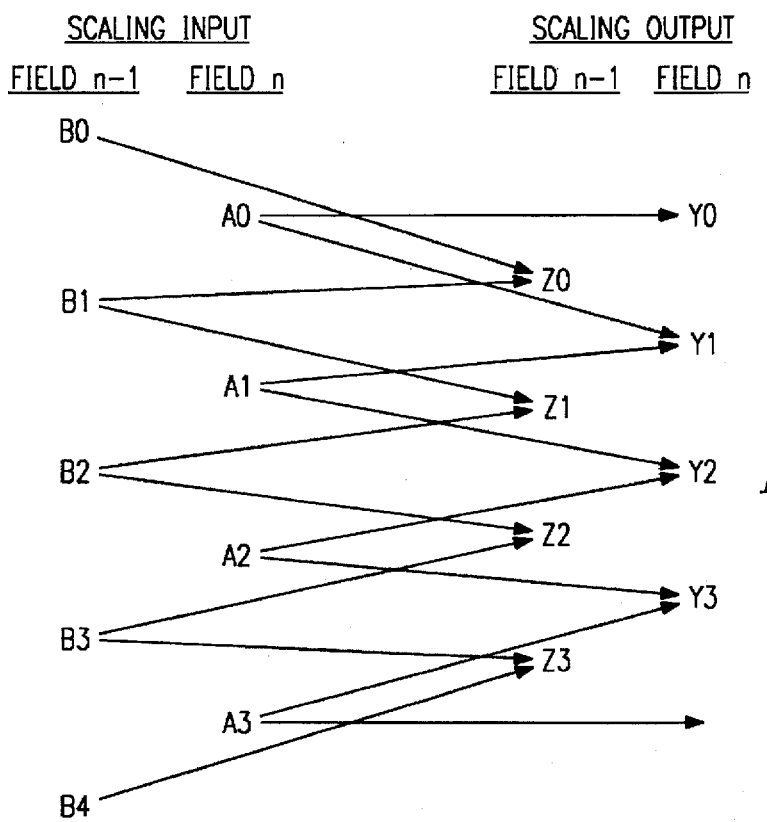
FIG. 6 illustrates intra-field interpolation to generate new pixel values for a vertically scaled image.

FIG. 6 illustrates an example of intra-field scaling, specifically, bi-linear interpolation for 3:4 scaling. Data from fields n-1 and n are used to create data for new fields n-1 and n, respectively. The pixels of lines 0, ... 3, ... n of the input fields are designated as A0 ... A3, ... An, and as B0, ... Z3, ... Bn. The pixels of lines 0, ... 4, ... n of the output field are designated as Z0, ... Z4, ... n, and as Y0, ... Y4, ... Yn. For field n, the algorithm for every four lines is:

Y0=A0
Y1=¼ A0+¾ A1
Y2=½ A1+½ A2

$Y3 = \frac{3}{4} A2 + \frac{1}{4} A3$

For field n-1, the algorithm for every four lines is:

$Z0 = \frac{1}{8} B0 + \frac{7}{8} B1$ $Z1 = \frac{3}{8} B1 + \frac{5}{8} B2$ $Z2 = \frac{5}{8} B2 + \frac{3}{8} B3$ $Z3 = \frac{7}{8} B3 + \frac{1}{8} B4$ Examples of intra-field vertical scaling algorithms, such as bi-linear and cubic interpolation for various scaling ratios, are described in U.S. patent Ser. No. 08/147,249, incorporated by reference above, and in U.S. patent Ser. No. 08/091,852, entitled "Method and Device for Multi-Format Television". These patent applications are assigned to Texas Instruments Incorporated and are incorporated by reference herein. The cubic interpolation method uses three input pixel values for each new pixel value, rather than two.

The various scaling algorithms can be modified for interlaced data by "centering" coefficients of pixel values from adjacent fields. For example, in algorithm described in connection with FIG. 6, pixel Z1 of field n-1 is between pixels Y1 and Y2 of field n. Thus, the coefficienus used to generate pixel Z1 ($\frac{3}{8}$ and $\frac{5}{8}$) are between those used for pixels Y1 and Y2 ($\frac{3}{8}$ is between $\frac{1}{4}$ and $\frac{1}{2}$; $\frac{5}{8}$ is between $\frac{3}{4}$ and $\frac{1}{2}$).

The inter-field scaling process 36 is performed with data in time-separated fields. Inter-field scaling is suitable for images having little or no motion because the image is well blended without being affected by frame-to-frame temporal variations in the image.

As with intra-field interpolation, various algorithms can be used, such as bi-linear or cubic interpolation. Where the new pixel values are to be in field n, the input values are from existing pixels in the same field, n, and from existing pixels in a previous field, n-1.

Figure 7:
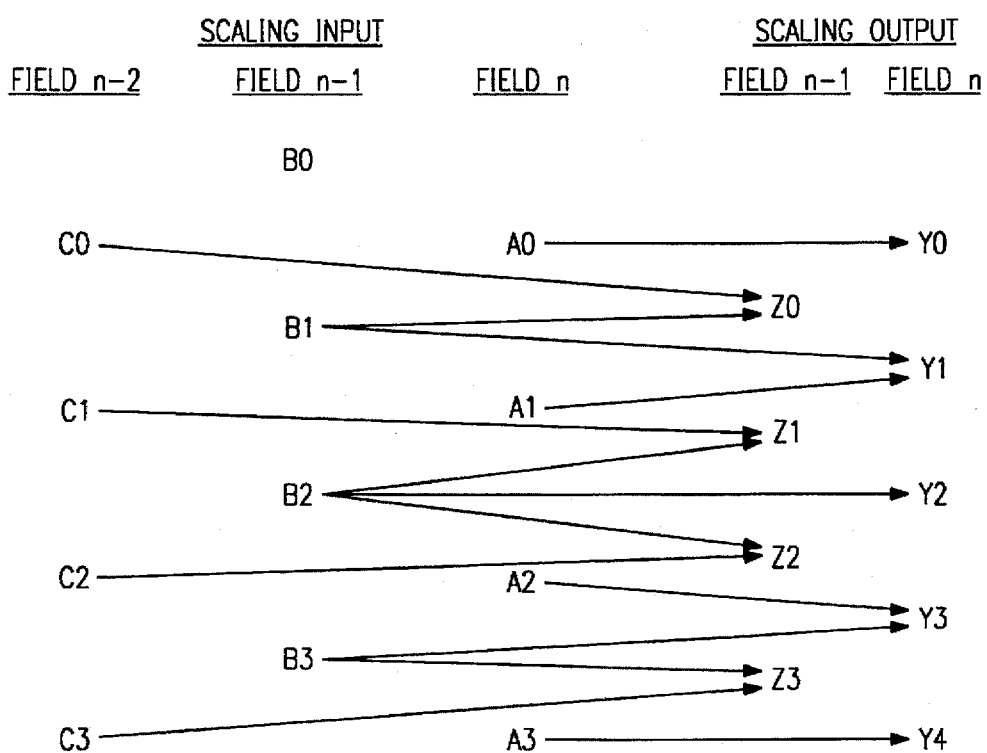
FIG. 7 illustrates inter-field interpolation to generate new pixel values for a vertically scaled image.

FIG. 7 illustrates an example of inter-field scaling, specifically, hi-linear interpolation for 3:4 scaling. For field n, the interpolation algorithm for every four lines is:

$Y0 = A0$ $Y1 = \frac{1}{2} B1 + \frac{1}{2} A1$ $Y2 = B2$ $Y3 = \frac{1}{2} A2 + \frac{1}{2} B3$ For field n-1, the algorithm is:

$Z0 = \frac{1}{4} C0 + \frac{3}{4} B1$ $Z1 = \frac{3}{4} C1 + \frac{1}{4} B2$ $Z2 = \frac{1}{4} B2 + \frac{3}{4} C2$ $Z3 = \frac{3}{4} B3 + \frac{1}{4} C3$ Like the process for intra-field scaling, the inter-field scaling process accommodates interlaced fields by "centering" coefficients of values of neighboring pixels in pairs of adjacent fields. In the above example, pixel Y1 in field n is between pixels Y0 and Y2. The coefficients of pixel Z1 ($\frac{3}{4}$ and $\frac{1}{4}$) are between those of its neighbors, Y0 and Y1 ($\frac{3}{4}$ is between 1 and $\frac{1}{2}$; $\frac{1}{4}$ is between 1 and $\frac{1}{2}$).

The pixel value outputs of the intra-field scaling process 35 and the inter-field scaling process 36 are delivered to mixer 38. As stated above, mixer 38 uses a motion magnitude value to select or combine these pixel value outputs.

For selecting between scaling outputs, a motion magnitude of a certain value could result in one or the other of the scaling outputs being used. A high motion value would result in use of the intra-field scaling pixel value, whereas a low motion value would result in use of the inter-field scaling pixel values.

For combining scaling outputs, the motion magnitude value could be used to determine the weight of each interpolated pixel value that will contribute to a final pixel value.

Thus, where the output values of the intra-field and inter-field scaling processes 35 and 35 are Yn' and Yn" (field n) and Zn' and Zn" (field n-1), the final pixel values are:

$Y0 = Y0'$ or $Y''$ $Y1 = M\ Y1' + (1-M)\ Y1''$ $Y2 = M\ Y2' + (1-M)\ Y2''$ $Y3 = M\ Y3' + (1-M)\ Y3''$ $Z0 = M\ Z0' + (1-M)\ Z0''$ $Z1 = M\ Z1' + (1-M)\ Z1''$ $Z2 = M\ Z2' + (1-M)\ Z2''$ $Z3 = M\ Z3' + (1-M)\ Z3''$

In some display systems, the pixel data is "de-interlaced" after scaling. This means that the data from each field is used to generate a complete frame, rather than being combined with an adjacent field. A simple example of de-interlacing is line doubling, where each line of a field is repeated to generate a frame with twice as many lines. The above described scaling process is compatible with de-interlacing processes.

Although the above description is in terms of interlaced fields of data, the same concepts could be applied to vertically scaling data that is not interlaced. This data may have already been de-interlaced or may originate as non-interlaced data. As a result, the data is already arranged in a series of frames rather than in a series of fields. A motion detector process 31 could be used to provide a motion magnitude signal as described above. New pixel values could be generated by both a intra-frame process and an inter-frame process, which would be like the intra-field and inter-field processes 35 and 36, but without the "centered" coefficients used for interlaced data. The mixer process 38 would combine or select between the outputs of the scaling processes as described above.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of generating new pixel values for vertical scaling an image represented by a digital video signal and having interlaced fields, comprising the steps of:

determining a motion magnitude value that indicates the extent to which the portion of the image to be represented by a new pixel is in motion;

generating an intra-field pixel value of said new pixel using pixel values of neighboring pixels in the same field wherein said step of generating said intra-field pixel value is performed by calculating a weighted average value of pixel values of neighboring pixels, and wherein the weighting coefficients of neighboring pixels in pairs of adjacent fields are centered to accommodate interlaced fields;

generating an inter-field pixel value of said new pixel, using pixel values of neighboring pixels in time-separated fields; and selecting between said intra-field pixel value and said inter-field pixel value, on the basis of said motion magnitude value, to generate a new pixel value; and repeating the above steps for each pixel of said image.

2. The method of claim 1, wherein the interpolation is bi-linear interpolation.

3. A method of generating new pixel values for vertical scaling an image represented by a digital video signal and having interlaced fields, comprising the steps of:

determining a motion magnitude value that indicates the extent to which the portion of the image to be represented by a new pixel is in motion;

generating au inter-field pixel value of said new pixel, using pixel values of neighboring pixels in the same field;

generating an inter-field pixel value of said new pixel using pixel values of neighboring pixels in the time-separated fields wherein said step of generating said inter-field pixel value is performed by calculating a weighted average value of pixel values of neighboring pixels, and wherein the weighting coefficients of neighboring pixels in pairs of adjacent fields are centered to accommodate interlaced fields; and selecting between said intra-field pixel value and said inter-field pixel value, on the basis of said motion magnitude value, to generate a new pixel value; And repeating the above steps for each pixel of said image.

4. The method of claim 3, wherein the interpolation is bi-linear interpolation.

5. A method of generating new pixel values for vertical scaling an image represented by a digital video signal and having interlaced fields, comprising the steps of:

determining a motion magnitude value that indicates the extent to which the portion of the image to be represented by a new pixel is in motion;

generating an intra-field pixel value of said new pixel, using pixel values of neighboring pixels in the same field;

generating an inter-field pixel value of said new pixel, using pixel values of neighboring pixels in time-separated fields; and selecting between said intra-field pixel value and said inter-field pixel value, on the basis of said motion magnitude value, to generate a new pixel value wherein said selecting step is performed by calculating a weighted average of said intra-field pixel value and said inter-field pixel value, with the weighting values being determined by said motion magnitude value; and repeating the above steps for each pixel of said image.

6. A processor system for generating new pixel values for vertical scaling, used in a digital image display system, comprising:

a motion detector for determining a motion magnitude value that indicates the extent to which the portion of the image represented by each new pixel is in motion;

a intra-field pixel generator for generating an intra-field pixel value of said each new pixel, using pixel values of neighboring pixels in the same field, wherein said intra-field pixel generator interpolates weighted values of said neighboring pixels, and wherein the weighting values of the neighboring pixels in pairs of adjacent fields are centered to accommodate interlaced fields;

an inter-field pixel generator for generating an inter-field pixel value of said each new pixel, using pixel values of neighboring pixels in time-separated fields; and a mixer for selecting between said intra-field pixel value and said inter-field pixel value, on the basis of said motion magnitude value, to generate said each new pixel value.

7. The processor of claim 6, wherein said motion detector is implemented with a serial video processor.

8. The processor of claim 6, wherein said intra-field pixel generator is a serial video processor.

9. The processor of claim 6, wherein said inter-field pixel generator is a serial video processor.

10. The processor of claim 6, wherein the interpolation is bi-linear interpolation.

11. A processor system for generating new pixel values for vertical scaling, used in a digital image display system, comprising:

a motion detector for determining a motion magnitude value that indicates the extent to which the portion of the image represented by each new pixel is in motion;

a intra-field pixel generator for generating an intra-field pixel value of said each new pixel, using pixel values of neighboring pixels in the same field;

an inter-field pixel generator for generating an inter-field pixel value of said each new pixel, using pixel values of neighboring pixels in time-separated fields wherein said inter-field pixel generator interpolates weighted values of said neighboring pixels, and wherein the weighting values of the neighboring pixels in pairs of adjacent fields are centered to accommodate interlaced fields; and a mixer for selecting between said intra-field pixel value and said inter-field pixel value, on the basis of said motion magnitude value, to generate said each new value.

12. The processor of claim 11, wherein the interpolation is bi-linear interpolation.

* * * * *